US012446563B2

(12) United States Patent
Janniello

(10) Patent No.: US 12,446,563 B2
(45) Date of Patent: Oct. 21, 2025

(54) INSECT TRAP

(71) Applicant: James P Janniello, Sarasota, FL (US)

(72) Inventor: James P Janniello, Sarasota, FL (US)

( * ) Notice: Subject to any disclaimer, the term of this patent is extended or adjusted under 35 U.S.C. 154(b) by 867 days.

(21) Appl. No.: 16/501,834

(22) Filed: Jun. 13, 2019

(65) Prior Publication Data

US 2020/0053997 A1    Feb. 20, 2020

Related U.S. Application Data

(60) Provisional application No. 62/763,483, filed on Jun. 15, 2018.

(51) Int. Cl.
*A01M 1/10* (2006.01)
*B65D 81/36* (2006.01)

(52) U.S. Cl.
CPC .............. *A01M 1/10* (2013.01); *B65D 81/365* (2013.01)

(58) Field of Classification Search
CPC .................................. A01M 1/10; A01M 1/106
See application file for complete search history.

(56) References Cited

U.S. PATENT DOCUMENTS

| | | | | |
|---|---|---|---|---|
| 1,499,222 A * | 6/1924 | Kiley | ...................... | A01M 1/02 43/107 |
| 1,618,513 A * | 2/1927 | Coghill | ................... | A01M 23/18 43/66 |
| 1,629,402 A * | 5/1927 | March | ................... | A01M 1/2011 43/121 |
| 2,029,989 A * | 2/1936 | Driggers | ............... | A01M 1/106 24/135 R |
| 2,126,701 A * | 8/1938 | Hamilton | ................ | A61J 19/06 4/258 |
| 2,770,066 A * | 11/1956 | O'Sullivan | ............. | A01M 1/10 43/107 |
| 3,320,692 A * | 5/1967 | Hellen | ................... | A01M 23/16 43/131 |
| 3,505,757 A * | 4/1970 | Hall | ...................... | A01M 1/106 43/118 |
| 4,044,494 A * | 8/1977 | Grajnert | ................ | A01M 1/106 43/119 |
| 4,802,302 A * | 2/1989 | Alnafissa | ................ | A01M 1/14 43/114 |
| 5,309,668 A * | 5/1994 | Barton | ................... | A01M 1/103 43/121 |
| 6,112,452 A * | 9/2000 | Campbell | .............. | B65D 51/00 43/107 |
| 6,158,165 A * | 12/2000 | Wilson | ................... | A01M 1/103 43/107 |
| 6,901,976 B1 * | 6/2005 | Bautista | .................. | A61J 19/02 141/340 |

(Continued)

FOREIGN PATENT DOCUMENTS

| | | | | |
|---|---|---|---|---|
| DE | 102009024934 A1 * | 12/2010 | ........... | B65D 17/161 |
| FR | 485777 A * | 6/1917 | ............ | A01M 1/106 |

(Continued)

*Primary Examiner* — Joshua J Michener
*Assistant Examiner* — Henry Hooper Mudd

(57) ABSTRACT

A device for converting a container into an insect trap. A device opening is configured to allow an insect to enter an interior cavity of the container and configured to prevent the insect from exiting the interior cavity of the container using a unidirectional barrier.

14 Claims, 4 Drawing Sheets

(56) References Cited

U.S. PATENT DOCUMENTS

| | | | |
|---|---|---|---|
| 7,503,142 B1 * | 3/2009 | Uhl | A01M 1/10 43/122 |
| D768,349 S * | 10/2016 | Macfarlane | D34/2 |
| 2006/0000946 A1 * | 1/2006 | Garofani | B64D 11/00 52/64 |
| 2009/0071060 A1 * | 3/2009 | McKay | A01M 1/10 43/122 |
| 2011/0209384 A1 * | 9/2011 | Moller | A01M 1/10 43/107 |
| 2014/0259877 A1 * | 9/2014 | Singleton | A01M 23/02 |
| 2016/0128504 A1 * | 5/2016 | Rosland | A47J 29/06 99/440 |
| 2016/0128907 A1 * | 5/2016 | Bagdasarian | A61J 19/00 4/274 |
| 2017/0006850 A1 * | 1/2017 | Doman | A01M 1/10 |
| 2017/0128327 A1 * | 5/2017 | Riley | A61J 19/02 |

FOREIGN PATENT DOCUMENTS

| | | | | |
|---|---|---|---|---|
| FR | 2699050 A3 * | 6/1994 | | A01M 1/02 |
| GB | 452511 A * | 2/1938 | | A01M 1/02 |
| WO | WO-2007043890 A2 * | 4/2007 | | B65D 17/165 |
| WO | WO-2010037396 A1 * | 4/2010 | | A01M 1/02 |

* cited by examiner

INSECT TRAP

TECHNICAL FIELD

The present application relates generally to a trap for capturing insects, and more specifically, in one example, to a device for converting a container into an insect trap.

BACKGROUND

Insects, such as flies, beetles, bugs, bees, ants, and the like, can prove a nuisance both in outdoors and indoors. The insects may be attracted to open containers of food items, beverages, and the like. For example, bees may be attracted to the soda in open soda cans and soda bottles, and may even venture into the can or bottle through the conventional opening of the container.

BRIEF DESCRIPTION OF THE DRAWINGS

Some embodiments are illustrated by way of example and not limitation in the figures of the accompanying drawings, in which.

DETAILED DESCRIPTION

Figure 1A:
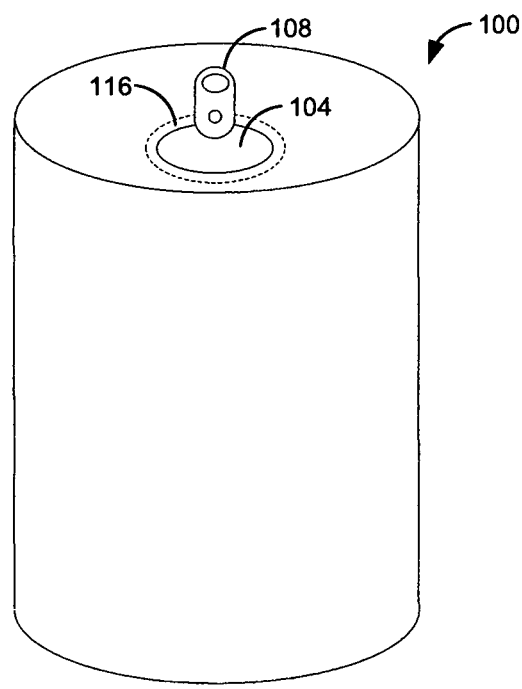
FIG. 1A is a diagram of an example can, in accordance with an example embodiment.

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other example embodiments of the invention exist and are within the scope of the invention, and logical, mechanical, electrical, and other changes may be made without departing from the scope or extent of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Generally, devices for converting containers into insect traps are disclosed. Each device includes a hole for enabling an insect to enter the interior cavity of the container. In one example embodiment, the opening in the device allows an insect to pass through in one direction (into the cavity of the container), but prevents an insect from exiting the cavity of the container. This may be accomplished with a unidirectional barrier comprised, for example, of stiff bristles or filaments that flex to enable the insect to pass in one direction and stiffen to prevent the insect from passing in another direction. In one example embodiment, the universal barrier comprises a flexible material in the shape of a cone. The flexible material may be an ultra-thin rubber sheet, such as in the range of 0.05 mm to 0.2 mm thick, that may be formed into the shape of the cone. The tip of the cone may be removed to leave a generally circular rim at each end of a cone. The diameter of the smaller circular rim of the cone may be set equal to, for example, 85% of the widest diameter of the insect the trap is designed to catch.

In one example embodiment, the universal barrier comprises a tube that allows an insect to pass through in one direction (into the cavity of the container), but prevents an insect from exiting the cavity of the container. The tube may be narrower in some portions and wider in other portions. For example, the interior diameter of the tube at the center may be narrower than the widest diameter of the type of insect the trap is designed to catch. In one example embodiment, the interior diameter of the tube at the center is 85% of the widest diameter of the type of insect the trap is designed to catch. In one example embodiment, the tube has a curved shape. For example, the tube may have the shape of the letter "s."

In one example embodiment, the tube may comprise stiff bristles or filaments attached to the interior of the tube or an end of the tube, and may be configured in the shape of a cone. The stiff bristles and filaments flex to enable the insect to pass in one direction, but prevent the insect from passing in another direction. The stiff bristles or filaments may be attached to any point of the interior of the tube, may be attached to one end of the tube, or both.

Similarly, the tube may comprise flexible material in the shape of a cone, as described more fully above. A cone may be attached to any point of the interior of the tube, may be attached to one end of the tube, or both. In this case, the larger rim of the cone is attached to the corresponding location on the tube. In embodiments utilizing a tube and a cone, the diameter of the tube may be, for example, equal to the widest width of the type of insect the trap is designed to catch.

In a first example embodiment, the device is inserted into the opening of a can. In a second example embodiment, the device is screwed onto the external screw thread that is integrated into the neck of a bottle. In a third example embodiment, the device is pressed onto the rim of a cup.

Figure 1C:
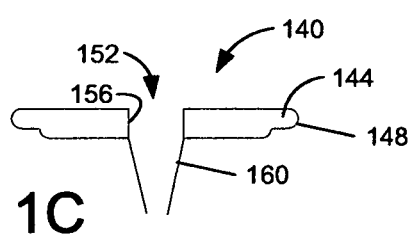
FIG. 1C is a cross-sectional elevation diagram of the example device of FIG. 1B, in accordance with an example embodiment.
Figure 1B:
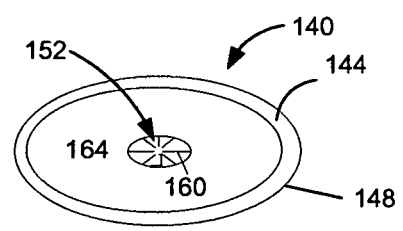
FIG. 1B is a top view of an example device for converting the can of FIG. 1A into an insect trap, in accordance with an example embodiment.
Figure 1D:
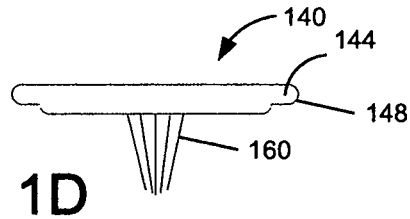
FIG. 1D is a side elevation diagram of the example device of FIG. 1B, in accordance with an example embodiment.

FIG. 1A is a diagram of an example can 100, in accordance with an example embodiment. The can 100 may comprise a pull tab 108 that may be raised to displace a tab in order to create an opening 104 in the can 100. FIG. 1B is a top view of an example device 140 for converting the can 100 of FIG. 1A into an insect trap, in accordance with an example embodiment. FIG. 1C is a cross-sectional elevation diagram of the example device 140 of FIG. 1B, in accordance with an example embodiment. FIG. 1D is a side elevation diagram of the example device 140 of FIG. 1B, in accordance with an example embodiment. The device 140 is inserted into the opening 104 of the can 100. The device 140 comprises a body 164 and a flange 144 that defines the outer rim 148 of the device 140. Once inserted into the can 100, the flange 144 rests upon the portion 116 of the can 100 that surrounds the opening 104.

As noted above, the device 140 comprises an opening 152 for allowing an insect to enter the interior cavity of the can 100. The opening 152 in the device 140 allows the insect to pass through in one direction (into the cavity of the can 100) but prevents the insect from exiting the cavity of the can 100. This is accomplished with a unidirectional barrier comprised, for example, of stiff bristles or filaments 160 that flex to enable the insect to pass in one direction, but prevent the insect from passing in an opposing direction. The stiff bristles or filaments 160 may be configured in the shape of a cone. The unidirectional barrier may be attached to the body 164 of the device 140. A cone manufactured of, for example, flexible rubber may be used in place of the cone of stiff bristles or filaments 160.

Figure 1E:
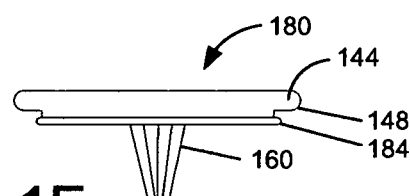
FIG. 1E is a side elevation diagram of a second example device for converting the can of FIG. 1A into an insect trap, in accordance with an example embodiment.

FIG. 1E is a side elevation diagram of a second example device 180 for converting the can 100 of FIG. 1A into an insect trap, in accordance with an example embodiment. Device 180 is similar to device 140 of FIG. 1B, but has a flexible flange 184 that flexes to enable the device 180 to be inserted into the opening 104 of the can 100 such that the flange 144 sits upon the portion 116 of the can 100 that surrounds the opening 104. Once inserted, the flexible flange 184 generally returns to its initial shape (as illustrated in FIG. 1E) and serves to secure the device 180 in the inserted position. The flexible flange 184 may be manufactured of rubber using rubber injection molding.

Figure 1F:
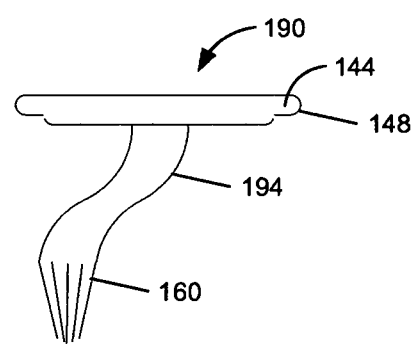
FIG. 1F is a side elevation diagram of a third example device for converting the can of FIG. 1A into an insect trap, in accordance with an example embodiment.

FIG. 1F is a side elevation diagram of a third example device 190 for converting the can 100 of FIG. 1A into an insect trap, in accordance with an example embodiment. The device 190 is similar to the device 140. In place of the stiff bristles or filaments 160 of the device 140, the device 190 includes a tube 194 that allows an insect to pass into the cavity of the can 100. The tube 194 may be narrower in some portions and wider in other portions. For example, the interior diameter of the tube 194 at the center may be narrower than the widest diameter of the type of insect the trap is designed to catch. In one example embodiment, the interior diameter of the tube 194 at the center is 85% of the widest diameter of the type of insect the trap is designed to catch. In one example embodiment, the tube 194 has a curved shape. For example, the tube 194 may have the shape of the letter "s."

In the example embodiment of FIG. 1F, stiff bristles or filaments 160 are attached to the tube 194. The bristles or filaments 160 flex to enable the insect to pass in one direction, but prevent the insect from passing in an opposing direction. The stiff bristles or filaments 160 may be attached at any point of the interior of the tube 194, may be attached to one end of the tube 194 (as illustrated in FIG. 1F), or both. In embodiments utilizing a tube 194 and a cone, the diameter of the tube may be, for example, equal to the widest width of the type of insect the trap is designed to catch.

Figure 2A:
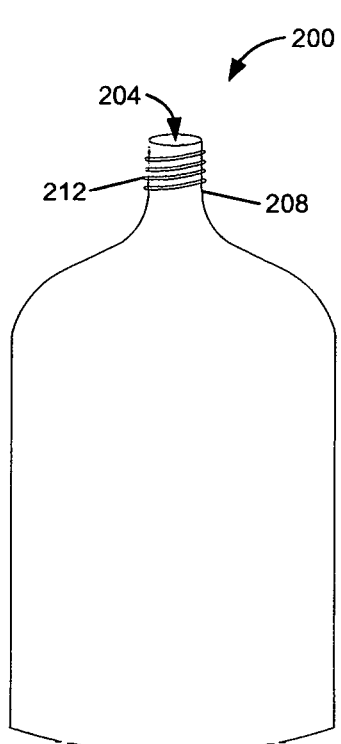
FIG. 2A is a diagram of an example bottle, in accordance with an example embodiment.
Figures 2B, 2C:
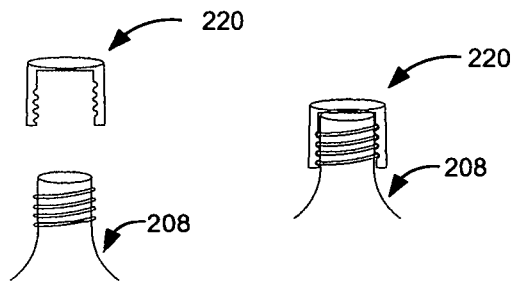
FIG. 2B is a cross-sectional elevation diagram of a bottle cap and a side elevation diagram of the neck of the bottle of FIG. 2A, in accordance with an example embodiment.
FIG. 2C is a cross-sectional elevation diagram of the bottle cap of FIG. 2B screwed onto the neck of the bottle of FIG. 2A, in accordance with an example embodiment.

FIG. 2A is a diagram of an example bottle 200, in accordance with an example embodiment. The bottle 200 may be a soda bottle, a water bottle, and the like. The bottle 200 may comprise an opening 204 within a neck 208 that has an integrated external screw thread 212. FIG. 2B is a cross-sectional elevation diagram of a bottle cap 220 and a side elevation diagram of the neck 208 of the bottle 200 of FIG. 2A, in accordance with an example embodiment. FIG. 2C is a cross-sectional elevation diagram of the bottle cap 220 of FIG. 2B screwed onto the neck 208 of the bottle 200 of FIG. 2A, in accordance with an example embodiment.

Figure 2D:
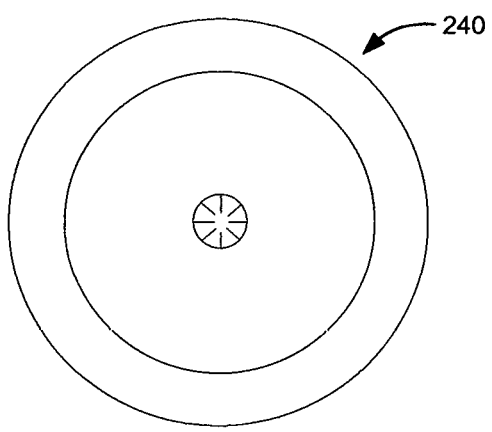
FIG. 2D is a top view of an example device for converting the bottle of FIG. 2A into an insect trap, in accordance with an example embodiment.
Figure 2E:
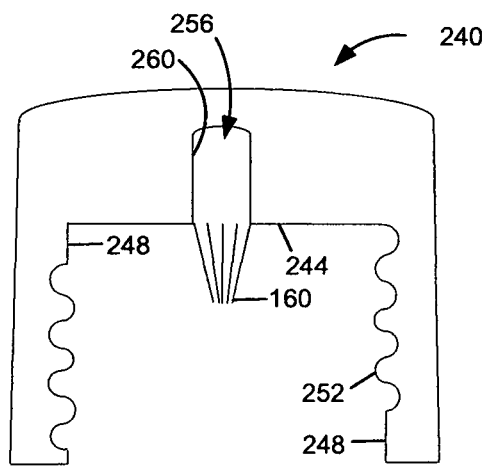
FIG. 2E is a cross-sectional elevation diagram of the device of FIG. 2D, in accordance with an example embodiment.

FIG. 2D is a top view of an example device 240 for converting the bottle 200 of FIG. 2A into an insect trap, in accordance with an example embodiment. FIG. 2E is a cross-sectional elevation diagram of the device 240 of FIG. 2D, in accordance with an example embodiment.

The device 240 may be screwed onto the neck 208 of the bottle 200. The device 240 comprises a top ceiling 244 and a cylindrical side wall 248. An internal screw thread 252 embedded into the cylindrical side wall 248 enables the device 240 to be screwed onto the external screw thread 212 that is integrated into the neck 208 of the bottle 200.

As noted above, the device 240 comprises an opening 256 for allowing an insect to enter the interior cavity of the bottle 200. The opening 256 in the device 240 allows the insect to pass through in one direction (into the cavity of the bottle 200) but prevents the insect from exiting the cavity of the bottle 200. This is accomplished with a unidirectional barrier comprised, for example, of stiff bristles or filaments 160 that flex to enable the insect to pass in one direction, but prevent the insect from passing in an opposing direction. The stiff bristles or filaments 160 may be configured in the shape of a cone. The unidirectional barrier may be attached to the top ceiling 244 of the device 140. A cone manufactured of, for example, flexible rubber may be used in place of the cone of stiff bristles or filaments 160.

Figure 2F:
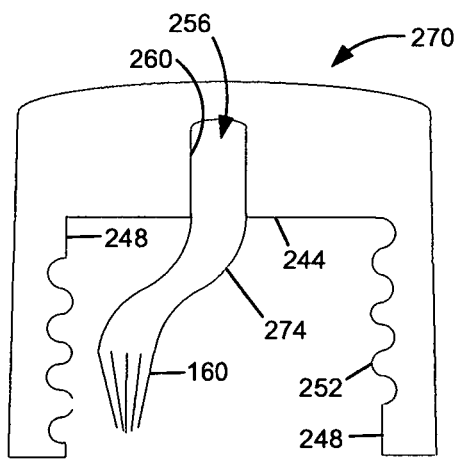
FIG. 2F is a cross-sectional elevation diagram of a second example device for converting the bottle of FIG. 2A into an insect trap, in accordance with an example embodiment.

FIG. 2F is a cross-sectional elevation diagram of a second example device 270 for converting the bottle 200 of FIG. 2A into an insect trap, in accordance with an example embodiment. The device 270 is similar to the device 240. In place of the stiff bristles or filaments 160 of the device 240, the device 270 comprises a tube 274 that allows an insect to pass into the cavity of the bottle 200. The tube 274 may be narrower in some portions and wider in other portions. For example, the interior diameter of the tube 274 at the center may be narrower than the widest diameter of the type of insect the trap is designed to catch. In one example embodiment, the interior diameter of the tube 274 at the center is 85% of the widest diameter of the type of insect the trap is designed to catch. In one example embodiment, the tube 274 has a curved shape. For example, the tube 274 may have the shape of the letter "s."

In the example embodiment of FIG. 2F, stiff bristles or filaments 160 are attached to the tube 274. The bristles or filaments 160 flex to enable the insect to pass in one direction, but prevent the insect from passing in an opposing direction. The stiff bristles or filaments 160 may be attached at any point of the interior of the tube 274, may be attached to one end of the tube 274 (as illustrated in FIG. 2F), or both.

Figure 3A:
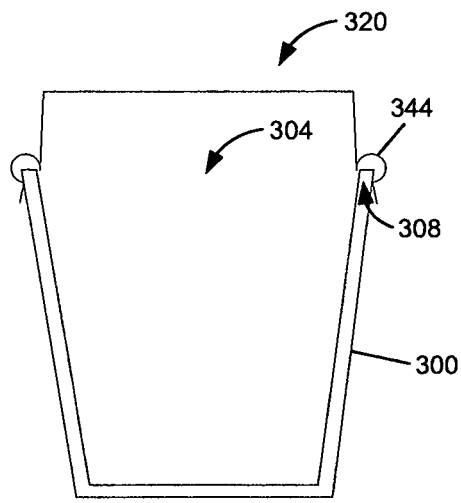
FIG. 3A is a cross-sectional diagram of an example cup and an example cup lid, in accordance with an example embodiment.

FIG. 3A is a cross-sectional diagram of an example cup 300 and an example cup lid 320, in accordance with an example embodiment. The cup 300 may be a coffee cup, a soda cup, and the like. The cup 300 includes an opening 304 defined by a generally circular rim 308 and may be manufactured using styrofoam, paper, and the like.

Figure 3D:
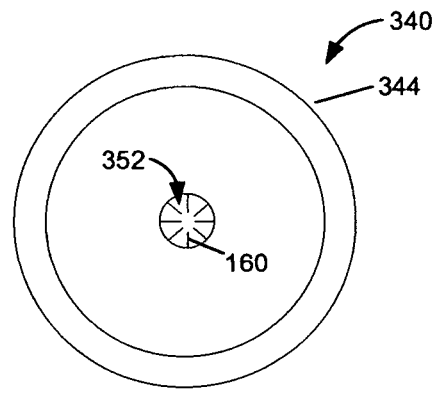
FIG. 3D is a top view of the example device of FIG. 3B, in accordance with an example embodiment.
Figure 3B:
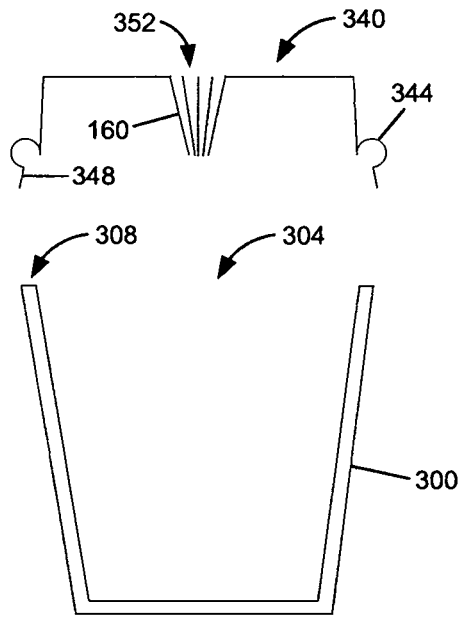
FIG. 3B is a cross-sectional elevation diagram of the cup of FIG. 3A and an example device for converting the cup of FIG. 3A into an insect trap, in accordance with an example embodiment.
Figure 3C:
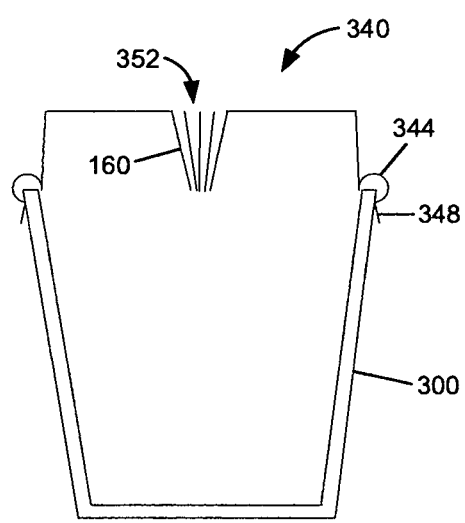
FIG. 3C is a cross-sectional elevation diagram of the example device of FIG. 3B installed onto the cup of FIG. 3A, in accordance with an example embodiment.

FIG. 3B is a cross-sectional elevation diagram of the cup 300 of FIG. 3A and an example device 340 for converting the cup 300 of FIG. 3A into an insect trap, in accordance with an example embodiment. The device 340 is pressed onto the generally circular rim 308 of the cup 300. FIG. 3C is a cross-sectional elevation diagram of the example device 340 of FIG. 3B installed onto the cup 300 of FIG. 3A, in accordance with an example embodiment. FIG. 3D is a top view of the example device 340 of FIG. 3B, in accordance with an example embodiment.

An annular portion 344 of the device 340 mounts onto the circular rim 308 of the cup 300. An outwardly flared skirt 348 assists in positioning the annular portion 344 of the device 340 onto the circular rim 308 of the cup 300.

As noted above, the device 340 comprises an opening 352 for allowing an insect to enter the interior cavity of the can 300. The opening 352 in the device 340 allows the insect to pass through in one direction (into the cavity of the cup 300) but prevents the insect from exiting the cavity of the cup 300. This is accomplished with a unidirectional barrier comprised, for example, of stiff bristles or filaments 160 that flex to enable the insect to pass in one direction, but prevent the insect from passing in an opposing direction. The stiff bristles or filaments 160 may be configured in the shape of a cone. A cone manufactured of, for example, flexible rubber may be used in place of the cone of stiff bristles or filaments 160.

Figure 3E:
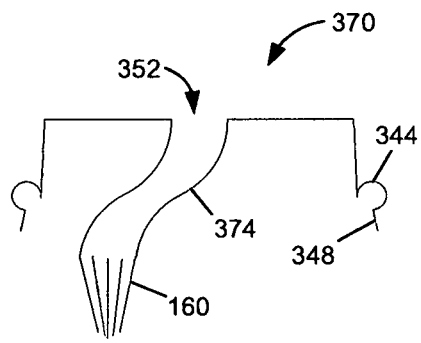
FIG. 3E is a cross-sectional elevation diagram of a second example device for converting the cup of FIG. 3A into an insect trap, in accordance with an example embodiment.

FIG. 3E is a cross-sectional elevation diagram of a second example device 370 for converting the cup 300 of FIG. 3A into an insect trap, in accordance with an example embodiment. The device 370 is similar to the device 340. In place of the stiff bristles or filaments 160 of the device 340, the device 370 includes a tube 374 that allows an insect to pass into the cavity of the cup 300. The tube 374 may be narrower in some portions and wider in other portions. For example, the interior diameter of the tube 374 at the center may be narrower than the widest diameter of the type of insect the trap is designed to catch. In one example embodiment, the interior diameter of the tube 374 at the center is 85% of the widest diameter of the type of insect the trap is designed to catch. In one example embodiment, the tube 374 has a curved shape. For example, the tube 374 may have the shape of the letter "s."

In the example embodiment of FIG. 3E, stiff bristles or filaments 160 are attached to the tube 374. The bristles or filaments 160 flex to enable the insect to pass in one direction, but prevent the insect from passing in an opposing direction. The stiff bristles or filaments 160 may be attached at any point of the interior of the tube 374, may be attached to one end of the tube 374 (as illustrated in FIG. 3E), or both.

Figure 4:
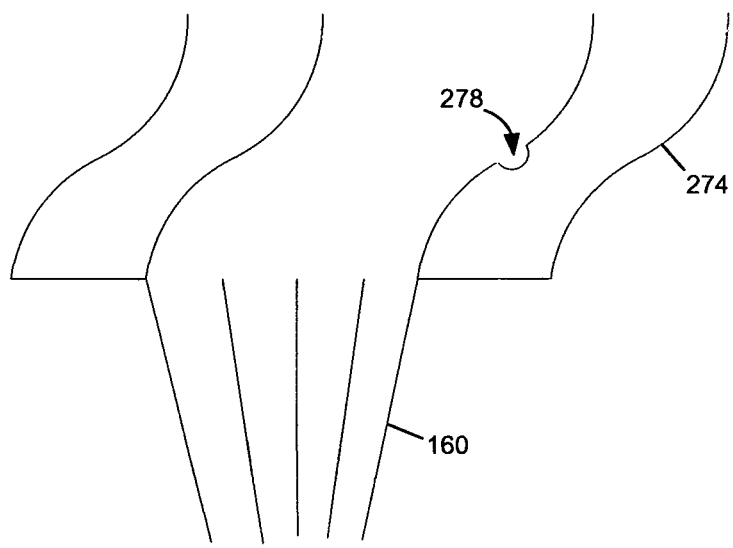
FIG. 4 is a cross-sectional elevation diagram of the tube of FIG. 2F, in accordance with an example embodiment.

FIG. 4 is a cross-sectional elevation diagram of the tube 274 of FIG. 2F, in accordance with an example embodiment. An indentation 278 is embedded in an interior wall of the tube 274. Insect bait, such as soda, may be poured into the indentation 278 by, for example, pouring the bait into the hole 256, by horizontally tilting the container (e.g., can 100, bottle 200, cup 300) until the contents (such as insect bait) of the container (e.g., can 100, bottle 200, cup 300) pours into the indentation 278, and the like. The tube 274 may include a plurality of indentations 278 embedded into the interior wall of the tube 274. Indentations 278 may be similarly embedded into the interior walls of tubes 194, 374. Similarly, indentations 278 may be embedded into sidewall 156 of device 140 and sidewall 260 of device 240.

Although certain examples are shown and described here, other variations exist and are within the scope of the invention. It will be appreciated, by those of ordinary skill in the art, that any arrangement, which is designed or arranged to achieve the same purpose, may be substituted for the specific embodiments shown. This application is intended to cover any adaptations or variations of the example embodiments of the invention described herein. It is intended that this invention be limited only by the claims, and the full scope of equivalents thereof.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A device, the device comprising:
    a body configured to be inserted into an opening of a can;
    a flange that defines an outer rim of the device, the flange being configured to sit upon a portion of the can defined by a target tab tear line of the can, at least a portion of the flange having a shape that conforms to at least a portion of the target tab tear line; and
    a device opening configured to allow an insect to enter an interior cavity of the can and configured to prevent the insect from exiting the interior cavity of the can.

2. The device of claim 1, further comprising a unidirectional barrier comprised of bristles or filaments that flex to enable the target insect to enter the interior cavity of the can and configured to prevent the target insect from exiting the interior cavity of the can, the unidirectional barrier attached to an area of the device surrounding the device opening.

3. The device of claim 1, further comprising a unidirectional barrier in a shape of a cone, the unidirectional barrier configured to flex to allow the target insect to enter the interior cavity of the can and configured to prevent the target insect from exiting the interior cavity of the can, the unidirectional barrier attached to an area of the device surrounding the device opening.

4. The device of claim 1, further comprising a tube attached to an area of the device surrounding the device opening, the tube configured to allow the target insect to enter the interior cavity of the can via the device opening.

5. The device of claim 4, further comprising a unidirectional barrier attached to an interior location of the tube or an end location of the tube, the unidirectional barrier comprising bristles or filaments that flex to enable the target insect to enter the interior cavity of the can.

6. The device of claim 4, further comprising a unidirectional barrier attached to an interior location of the tube or an end location of the tube, the unidirectional barrier comprising a flexible rubber cone that flexes to allow the target insect to enter the interior cavity of the can.

7. A device, the device comprising:
    an annular portion, the annular portion configured to be pressed onto a circular rim of a cup; and
    a unidirectional barrier, wherein the unidirectional barrier is in a shape of a cone and configured to flex to allow a target insect to enter an interior cavity of the cup via a device opening and to prevent the insect from exiting the interior cavity of the cup, wherein a narrow end of the cone is configured to have a diameter that is narrower than a given diameter of the target insect in a non-flexed configuration and is configured to have a diameter that is at least as large as the given diameter of the target insect in a flexed configuration.

8. The device of claim 7, wherein the annular portion further comprises an outwardly flared skirt that assists in positioning the annular portion of the device onto the circular rim of the cup.

9. The device of claim 7, wherein the unidirectional barrier is attached to an area of the device surrounding the device opening.

10. The device of claim 7, wherein the unidirectional barrier comprises bristles or filaments that flex to enable the target insect to enter the interior cavity of the cup.

11. The device of claim 7, further comprising a tube coupled to an area of the device surrounding the device opening, the tube configured to allow the target insect to enter the interior cavity of the cup via the device opening.

12. The device of claim 11, further comprising a unidirectional barrier attached to an interior location of the tube or an end location of the tube, the unidirectional barrier comprising bristles or filaments that flex to allow the target insect to enter the interior cavity of the cup.

13. The device of claim 11, further comprising a unidirectional barrier attached to an interior location of the tube or an end location of the tube, the unidirectional barrier comprising a flexible rubber cone that flexes to allow the target insect to enter the interior cavity of the cup.

14. The device of claim 1, wherein the shape of the flange matches a shape of the target tab tear line.

* * * * *